Oct. 9, 1928.　　　　　　　　　　　　　　　　　1,686,716
H. T. THOMAS
COMBINATION CLUTCH AND BRAKE CONTROL MECHANISM
Filed Oct. 3, 1927　　　　2 Sheets-Sheet 1

Inventor
Horace T. Thomas
By Whittemore Hulbert
Whittemore & Belknap Attorneys

Oct. 9, 1928.

H. T. THOMAS 1,686,716

COMBINATION CLUTCH AND BRAKE CONTROL MECHANISM

Filed Oct. 3, 1927      2 Sheets-Sheet 2

Inventor

Horace T. Thomas

By Whittemore Hulbert
Whittemore & Belknap
Attorneys

Patented Oct. 9, 1928.

1,686,716

UNITED STATES PATENT OFFICE.

HORACE T. THOMAS, OF LANSING, MICHIGAN, ASSIGNOR TO REO MOTOR CAR COMPANY, OF LANSING, MICHIGAN, A CORPORATION OF MICHIGAN.

COMBINATION CLUTCH AND BRAKE-CONTROL MECHANISM.

Application filed October 3, 1927. Serial No. 223,724.

This invention relates to a combination clutch and brake control mechanism and more particularly to apparatus of this character adapted for association with a hydraulic brake system.

While the invention is capable of many and varied uses it finds particular utility when associated with motor vehicles and the like wherein, with this invention, it is possible to actuate and control a clutch and brake by the movement of a single lever, such for instance as a clutch pedal. To this end the invention contemplates the provision of means or mechanism whereby the clutch control pedal or lever is connected to the master cylinder operating arm of the hydraulic brake mechanism in such a manner that the initial movement of the clutch lever functions to disengage the clutch while the continued movement of this lever operates a brake cylinder control arm thereby operating the hydraulic brakes.

The invention also contemplates the provision of mechanism and means whereby the usual brake lever or pedal is coupled with the brake mechanism in such a manner that the brakes may be operated by either the clutch or brake lever independent of the other.

In addition the invention contemplates other objects, advantages and novel details of construction all of which will be made more apparent as this description proceeds, especially when considered in connection with the accompanying drawings wherein.

Figure 1:
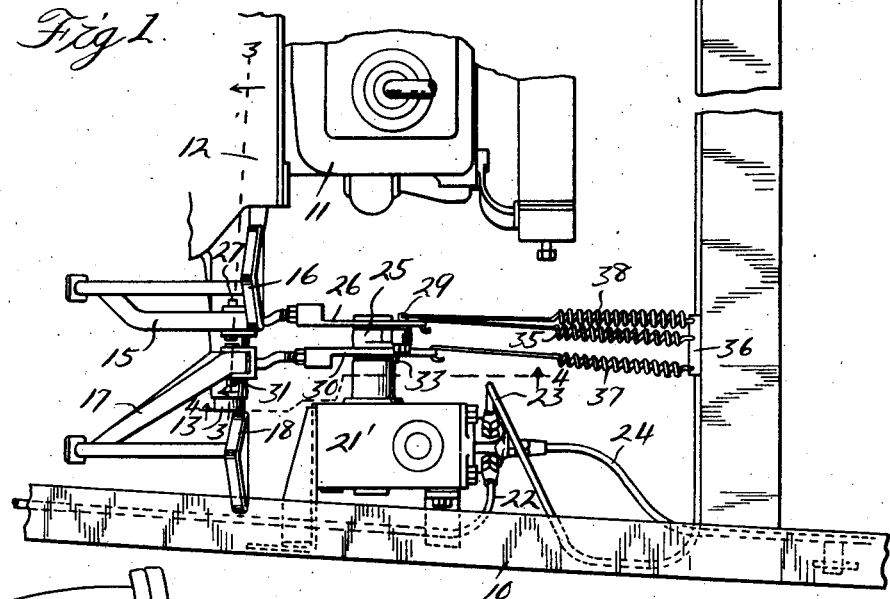
Figure 1 is a fragmentary plan view of a portion of a motor vehicle chassis showing my improved combined clutch and brake mechanism associated therewith.
Figure 2:
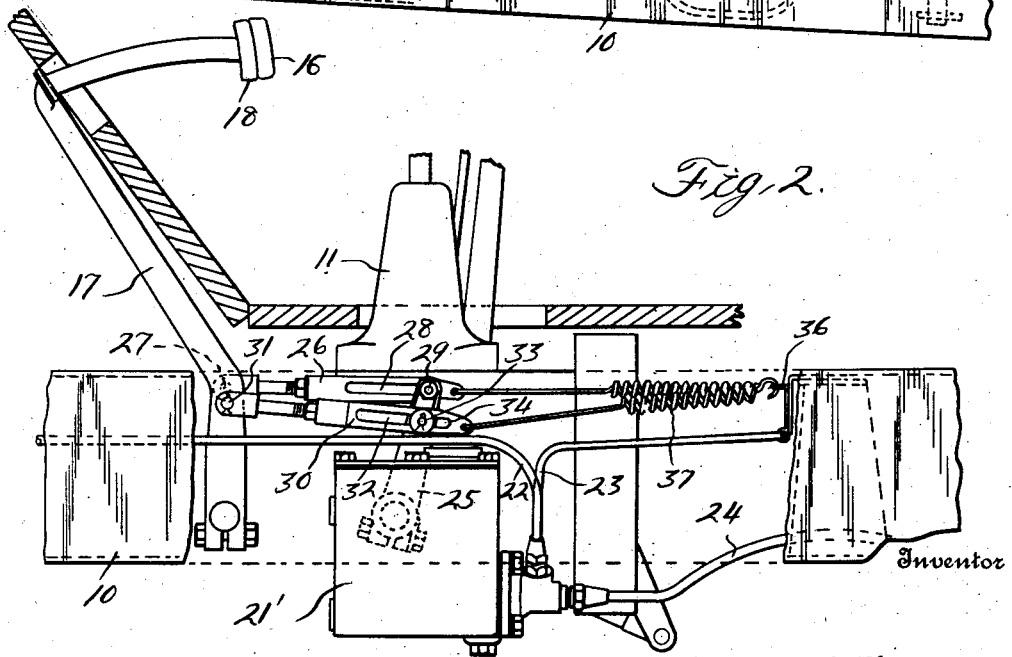
Figure 2 is a side elevation of the structure illustrated in Figure 1.
Figure 5:
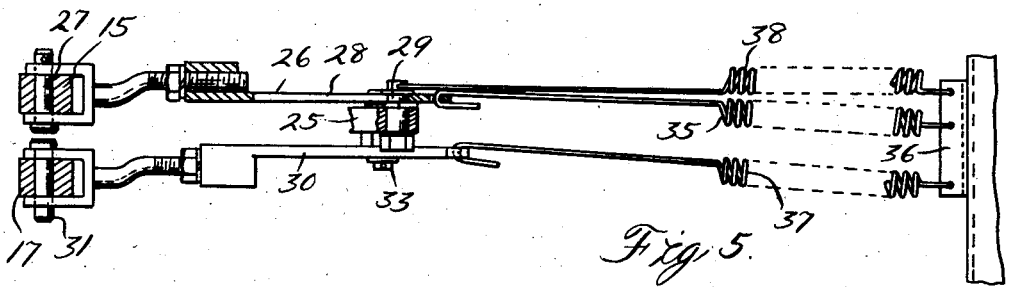
Figure 5 is a horizontal sectional view through the structure illustrated in Figure 4.

Referring now more particularly to the drawings wherein like reference characters indicate like parts it will be noted that there is fragmentarily illustrated the side frame members 10 of a motor vehicle chassis upon which is mounted the transmission illustrated fragmentarily at 11 and the clutch mechanism illustrated fragmentarily at 12. The clutch is operable by means of a clutch shaft 13 in any desired or approved manner, as for instance by means of a clutch collar 14 moved when shaft 13 is rocked.

Loosely journaled on shaft 13 is a brake lever 15 here shown as provided with a brake pedal 16 and also loosely journaled upon shaft 13 is a clutch lever 17 here shown as provided with a clutch pedal 18. Clutch lever 17 is coupled to shaft 13 by means of a pin or stud 19 operating in a slot 20 of a lever 21 keyed to the end of shaft 13. Thus when clutch lever 17 is depressed shaft 13 will be rocked to disengage the clutch in any of the well known and approved ways.

This invention contemplates the combined control of the clutch and a hydraulic brake mechanism which latter may obviously be of any improved or desired type. In the present disclosure there is illustrated a master cylinder 21' of the type now generally employed in hydraulic brake mechanisms connected by tubes or conduits 22 and 23 to the left and right front wheel brake cylinders respectively and by means of a tube 24 to the rear wheel brake cylinders. The master cylinder 21' is provided with a control arm 25 which when rocked forces the fluid through the conduits 22, 23 and 24 to operate the brakes in the well known manner.

The master cylinder control arm 25 is connected to brake lever 15 by means of a link 26 pivotally connected to the brake lever 15 as at 27 and slotted as at 28 for engagement by a pin 29 carried by the upper end of the master cylinder control arm. Pin 29 normally lies in the rear end of slot 28 so that the initial movement of brake lever 15 will rock control arm 25 to actuate the brakes.

Figure 4:
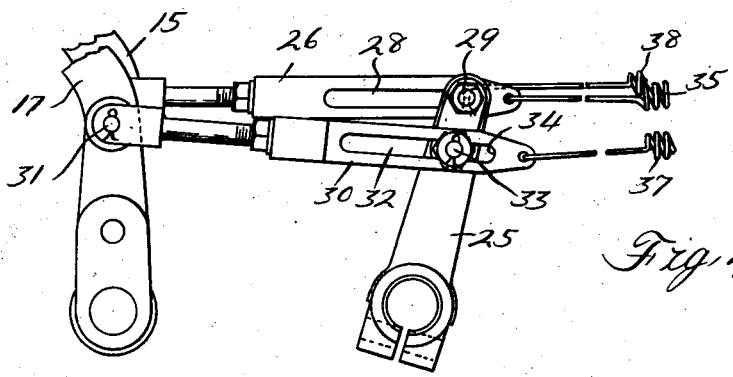
Figure 4 is an enlarged fragmentary sectional view taken substantially on the plane indicated by line 4—4 in Figure 1.
Figure 3:
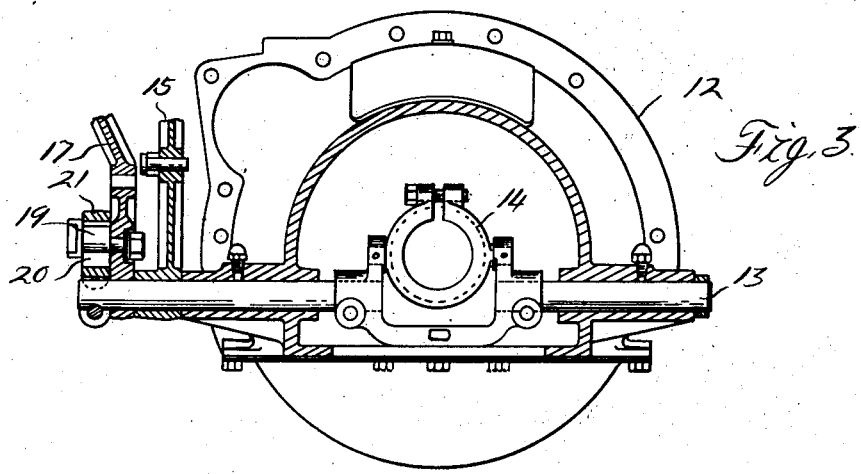
Figure 3 is a fragmentary sectional view taken substantially on the plane indicated by line 3—3 in Figure 1.

Clutch lever 17 is connected to control arm 25 by means of a link 30 pivotally connected thereto as at 31 and slotted as at 32 for engagement by a pin 33 carried by control arm 25 at a point preferably spaced from the end thereof. Pin 33, as most clearly illustrated in Figure 4, normally lies at a point spaced from the rear end 34 of slot 32. By reason of this construction the initial movement of clutch lever 17 does not affect control arm 25. The pin 33, during this movement, travels from its position illustrated in Figure 4 toward the rear end 34 of the slot. This idle movement is sufficient to permit the clutch lever 17 to be moved sufficiently to disengage the clutch and continued movement of the clutch lever 17 with the pin 33 engaged at the end of the slot 34 causes a movement of arm 25 which actuates the brake during the latter part of the clutch lever movement.

Link 26 has attached thereto a spring 35, the other end of which is anchored to a bracket 36 and link 30 has attached thereto a spring 37 the other end of which is attached to bracket 36. A spring 38 is secured to the end of pin 29 carried by the upper end of control arm 25 and the other end of this spring is also anchored to bracket 36. These springs tend to return the parts to the position illustrated in the drawings which is the position of rest.

With the herein described construction it will be apparent that it is possible to actuate the brakes by either the brake lever 15 or clutch lever 17 independent of the other, the slot 28 in link 26 permitting a movement of control arm 25 by means of clutch lever 17 and slot 32 in link 30 permitting a movement of control arm 25 by brake lever 15. It will also be apparent that movement of clutch lever 17 first disengages the clutch and then actuates arm 25 controlling the hydraulic brakes.

While an embodiment of the invention has been illustrated and described herein somewhat in detail it will be readily apparent that the specific construction illustrated may be modified and rearranged without departing from the spirit and scope of this invention and to this end reservation is made to make such changes as may come within the purview of the accompanying claims.

What I claim as my invention is:

1. In combination, a hydraulic braking system, a clutch, a combination brake and clutch operating lever and means connecting said lever to said clutch and brake system whereby said clutch is disengaged prior to the operation of said brake.

2. In combination, a clutch operating lever, a hydraulic brake mechanism, an operating arm therefor, and a lost motion connection between said lever and arm whereby said brake mechanism is operated during a portion of the movement of said lever.

3. In combination, a clutch operating lever, a hydraulic brake mechanism, an operating arm therefor, and a lost motion connection between said lever and arm whereby the initial movement of said lever disengages the clutch and the further movement of said lever operates said brake mechanism.

4. In combination, a clutch operating lever, a hydraulic brake mechanism, an operating arm therefor, and a pin and slotted link connection between said lever and arm whereby the initial movement of said lever disengages the clutch and the further movement operates said brake mechanism.

5. In a combined brake and clutch mechanism, a clutch operating lever, a hydraulic brake mechanism and means connecting said lever to said brake mechanism whereby the initial movement of said lever disengages the clutch and the further movement of said lever operates said brake mechanism.

6. In apparatus of the character described, a clutch, a clutch operating lever, a hydraulic brake mechanism including a master cylinder operating arm and a pin and slotted link connection between said arm and said lever whereby the initial movement of said lever disengages said clutch and the further movement of said lever operates said brake mechanism.

7. In apparatus of the character described, a hydraulic brake mechanism including a master cylinder operating arm, clutch and brake levers and means connecting said levers to said arm whereby the latter may be operated upon movement of either of said clutch or brake levers.

8. In apparatus of the character described, a hydraulic brake mechanism including a master cylinder operating arm, clutch and brake levers and means connecting each of said levers to said arm whereby said brake mechanism may be operated upon movement of either of said levers independent of the other.

9. In apparatus of the character described, a hydraulic brake mechanism including a master cylinder operating arm, clutch and brake levers and a slotted link and pin connection between each of said levers and said arm whereby said brake may be independently operated upon movement of either of said levers.

10. In apparatus of the character described, a hydraulic brake mechanism including a master cylinder operating arm, clutch and brake levers, means connecting said brake lever to said arm and means connecting said clutch lever to said arm whereby said brake is operated upon a portion of the movement of said clutch lever.

In testimony whereof I affix my signature.

HORACE T. THOMAS.